(12) United States Patent
Ichimiya

(10) Patent No.: US 8,315,513 B2
(45) Date of Patent: Nov. 20, 2012

(54) FOCUS DETECTION APPARATUS AND CONTROL METHOD THEREOF

(75) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 12/764,673

(22) Filed: Apr. 21, 2010

(65) Prior Publication Data

US 2010/0290773 A1    Nov. 18, 2010

(30) Foreign Application Priority Data

May 15, 2009  (JP) ................. 2009-118592

(51) Int. Cl.
*G03B 13/36* (2006.01)
(52) U.S. Cl. .................. 396/101; 396/111; 396/233
(58) Field of Classification Search .................. 396/101, 396/111, 233
See application file for complete search history.

(56) References Cited

U.S. PATENT DOCUMENTS

| 6,009,280 A * | 12/1999 | Akamatsu et al. ............ 396/121 |
| 7,414,231 B2 * | 8/2008 | Fukui .......................... 250/201.2 |
| 2005/0158044 A1 * | 7/2005 | Ide et al. ....................... 396/71 |
| 2010/0182494 A1 * | 7/2010 | Park et al. .................... 348/349 |

FOREIGN PATENT DOCUMENTS

| JP | 60-101514 | 6/1985 |
| JP | 2000292682 A * | 10/2000 |

* cited by examiner

*Primary Examiner* — Clayton E Laballe
*Assistant Examiner* — Leon W Rhodes, Jr.
(74) *Attorney, Agent, or Firm* — Cowan, Liebowitz & Latman, P.C.

(57) ABSTRACT

A focus detection apparatus that measures, in advance, and stores shading coefficients for light sources of different types, and in a focus detection operation, generates light source information for determining a light source that irradiates an object based on outputs from a plurality of photometry sensors with different spectral characteristics and switches the shading coefficient of a focus detection sensor among shading coefficients stored according to the light source information.

6 Claims, 13 Drawing Sheets

FLUORESCENT LIGHT

SHADING WAVE
(BEFORE COMPENSATION)

SHADING WAVEFORM
(BEFORE COMPENSATION)

SHADING WAVEFORM
(AFTER COMPENSATION)

FLUORESCENT LIGHT

SHADING WAVEFORM
(BEFORE COMPENSATION)

SHADING WAVEFORM
(AFTER COMPENSATION)

FLOOD LAMP

SHADING WAVEFORM
(BEFORE COMPENSATION)

SHADING WAVEFORM
(AFTER COMPENSATION)

FILL LIGHT

FOCUS DETECTION APPARATUS AND CONTROL METHOD THEREOF

BACKGROUND OF THE INVENTION

1. Field of the Invention

The present invention relates to the improvement of focus detection accuracy under light sources of different types in an auto-focus camera.

2. Description of the Related Art

Film/digital single lens reflex cameras commonly use a so-called TTL (Through The Lens) phase difference detection-type focus detection (hereinafter also referred to as AF) method in which a light flux passed through a photographing lens is split by a beam splitter, images of the respective light fluxes are formed on a focus detection sensor by two imaging lens with displaced optical axes, a defocus amount is calculated from a displacement between the two formed images, and focusing is achieved by driving the photographing lens according to the calculated defocus amount.

FIG. 14 illustrates an example of a phase difference detection-type focus detection apparatus that uses a secondary imaging system. In the apparatus, a field lens 102 that shares the same optical axis as a photographing lens 101 that performs focus detection is disposed in the vicinity of a predicted imaging plane F of the photographing lens 101. Two secondary imaging lenses 103a and 103b are placed side by side behind the photographing lens 101 and the field lens 102. Furthermore, light receiving sensors 104a and 104b are disposed behind the secondary imaging lenses 103a and 103b. The field lens 102 forms two different exit pupils 101a and 101b of the photographing lens 101 on pupil planes of the two secondary imaging lenses 103a and 103b.

Consequently, light fluxes from an object surface S respectively entering the secondary imaging lens 103a and 103b become light fluxes output from equal-area regions of the exit pupils 101a and 101b of the photographing lens 101 which correspond to the respective secondary imaging lenses 103a and 103b and which do not overlap each other.

As described above, the received light amount distributions of the light fluxes from the equal-area exit pupils 101a and 101b on sensors 104a and 104b are ideally uniform. However, since a simple lens structure is required in consideration of a permissible size, cost, and convenience of production of the focus detection apparatus, lens aberration becomes relatively large. Consequently, the imaging relationship between pupils of the secondary imaging lenses 103a and 103b and the pupils 101a and 101b of the photographing lens 101 becomes incomplete, thereby causing a nonuniformity in the light amount or, in other words, causing shading such as that illustrated in FIG. 15 to remain on the sensors 104a and 104b.

A focus detection apparatus arranged so as to remove a difference in light amount distribution between sensors 104a and 104b with respect to an object surface of uniform brightness to obtain the same light amount distribution is disclosed in Japanese Patent Application Laid-Open No. S60-101514. The invention described in the patent document compensates shading by assigning a weight coefficient to an amplitude of a photoelectric conversion output signal of a sensor according to positions of respective pixels on the sensor.

However, with the focus detection apparatus disclosed in Japanese Patent Application Laid-Open No. S60-101514 described above, depending on the type of light source illuminating an object, there may be cases where shading between sensors cannot be compensated.

When the focus detection apparatus disclosed in Japanese Patent Application Laid-Open No. S60-101514 is applied to a single lens reflex camera, a semi-transparent optical member 105 (main mirror) such as a beam splitter is disposed between the photographing lens 101 and the field lens 102 as illustrated in FIG. 16. The main mirror 105 is provided in order to split a light flux having passed through the photographing lens 101 at a predetermined ratio to a focus detection optical system and a finder optical system.

The characteristics of dependency on angle of incidence of a spectrum transmittance of the main mirror 105 are illustrated in FIG. 17. Approximately 40% of light with a wavelength of 600 nm or less is transmitted to the focus detection optical system. On the other hand, 40% or more of light of 600 nm or greater is transmitted to the focus detection optical system. The rate of transmittance gradually increases as the wavelength increases.

This is due to the spectrum transmittance of the main mirror 5 configured such that more near infrared light is transmitted. This characteristic is a result of a photoelectric conversion element as a auto-focusing sensor is sensitive to wavelengths up to around 1100 nm and performs focusing operations even at low brightness, and when a focusing operation cannot be performed under low brightness, a near-infrared (around 700 nm) light is irradiated by a light emitting diode from a camera to an object.

Meanwhile, a human eye is most sensitive to light ranging from around 450 to 650 nm. Light whose wavelength does not fall into this frequency range is not particularly important to a finder optical system from the perspective of color reproducibility.

Here, it should be noted that with respect to the optical configuration of the main mirror 105, the spectrum transmittance of the main mirror 105 is angle-dependent. In particular, with long-wavelength light of 600 nm or greater, transmittance varies according to the angle of incidence of a light beam.

The angles of incidence of light fluxes from the exit pupils 101a and 101b of the photographing lens 101 when being transmitted through the main mirror 105 differ from each other. Furthermore, the angles of incidence of light fluxes received at positions of respective pixels of the sensors 104a and 104b when being transmitted through the main mirror 105 also differ from each other. Therefore, shading of the sensors 104a and 104b varies depending on whether or not a light source irradiating the object includes a long-wavelength component.

FIG. 18 is a diagram illustrating spectral sensitivities of light sources, where the abscissa represents wavelength and the ordinate represents relative energy. In the diagram, a fluorescent light is denoted by F, a flood lamp is denoted by L, and a fill light described earlier is denoted by A.

The diagram illustrates that compared to components with longer wavelengths than 620 nm being almost absent among the wavelength components of the fluorescent light, with the flood lamp, the longer the wavelength, the stronger the relative sensitivity.

FIGS. 19A to 21B illustrate examples of shading waveforms and compensated waveforms of sensors in light sources of various types.

A shading waveform under a fluorescent light is illustrated in FIG. 19A. A result of compensation by performing an operation using an optimal compensation coefficient on the shading waveform of FIG. 19A is illustrated in FIG. 19B. In addition, a shading waveform under a flood lamp is illustrated in FIG. 20A. Since the angle of incidence of the light flux from the exit pupil 101a to the main mirror 105 is smaller than the angle of incidence of the light flux from the exit pupil 101b, the transmittance of near infrared light is high. Therefore, in FIG. 20A, the sensor 104a is shown obtaining a greater light amount than the sensor 104b. In addition, when taking cell positions of sensors into consideration, the further up on the sensor, the smaller the angle of incidence of a light flux to the main mirror. Therefore, the upper side of the sensor obtains a greater light amount than the lower side.

FIG. 20B illustrates a result of compensation performed on the shading waveform illustrated in FIG. 20A using the compensation coefficient computed from the shading waveform illustrated in FIG. 19A. As illustrated in FIG. 20A, uncompensated regions remain when the compensated waveform is not uniform.

In addition, a shading waveform under a fill light is illustrated in FIG. 21A. Since the fill light is near infrared light, the angular dependence of shading has increased as compared to FIG. 20A. FIG. 21B illustrates a result of compensation performed on the shading waveform illustrated in FIG. 21A using the compensation coefficient computed from the shading waveform illustrated in FIG. 19B. FIG. 21B shows that the remaining uncompensated region is even greater than in FIG. 20B.

As shown, depending on the type of light source irradiating an object, an uncompensated region of shading remains between sensors, causing a reduction in the detection accuracy of a displacement between two images.

SUMMARY OF THE INVENTION

It is an aspect of the invention to provide, in a TTL auto-focus camera, an auto-focus camera system with a high focus detection accuracy which does not cause focal point displacement under light sources of different types. In order to achieve the object, according to the present invention, a focus detection apparatus includes: a focus detection sensor that detects an image signal of an object based on a light flux obtained from an object light transmitted through a photographing lens; a first photometry sensor that measures a visible light region; a second photometry sensor that measures a region whose wavelength is longer than the visible light region; and a compensation unit that compensates the image signal from the focus detection sensor based on outputs from the first and second photometry sensors.

As described above, according to the present invention, since a type of a light source irradiating an object can be determined using an output signal from a photometry sensor and an image signal output by a focus detection sensor can be compensated based on the determination result, focus detection accuracy can be improved even during photography performed under object-irradiating light sources of different types.

In addition, with a compensation operation method according to the present invention, since the operation method only requires compensation coefficients corresponding to two types of light sources, the capacity of a memory for storing data required to perform operations can be reduced.

Furthermore, with another compensation operation method according to the present invention, since the operation method only requires a compensation coefficient corresponding to one light source type, the capacity of the memory for storing data required to perform operations can be further reduced.

Moreover, with yet another compensation operation method according to the present invention, since the operation method uses a rate of near infrared light in a light flux from an object, a compensation coefficient under fluorescent light (visible light), and a coefficient of an angle of incidence of the light flux to an optical member, focus detection with high accuracy can be achieved with respect to light sources of different types.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

<First Embodiment>

Figure 1:
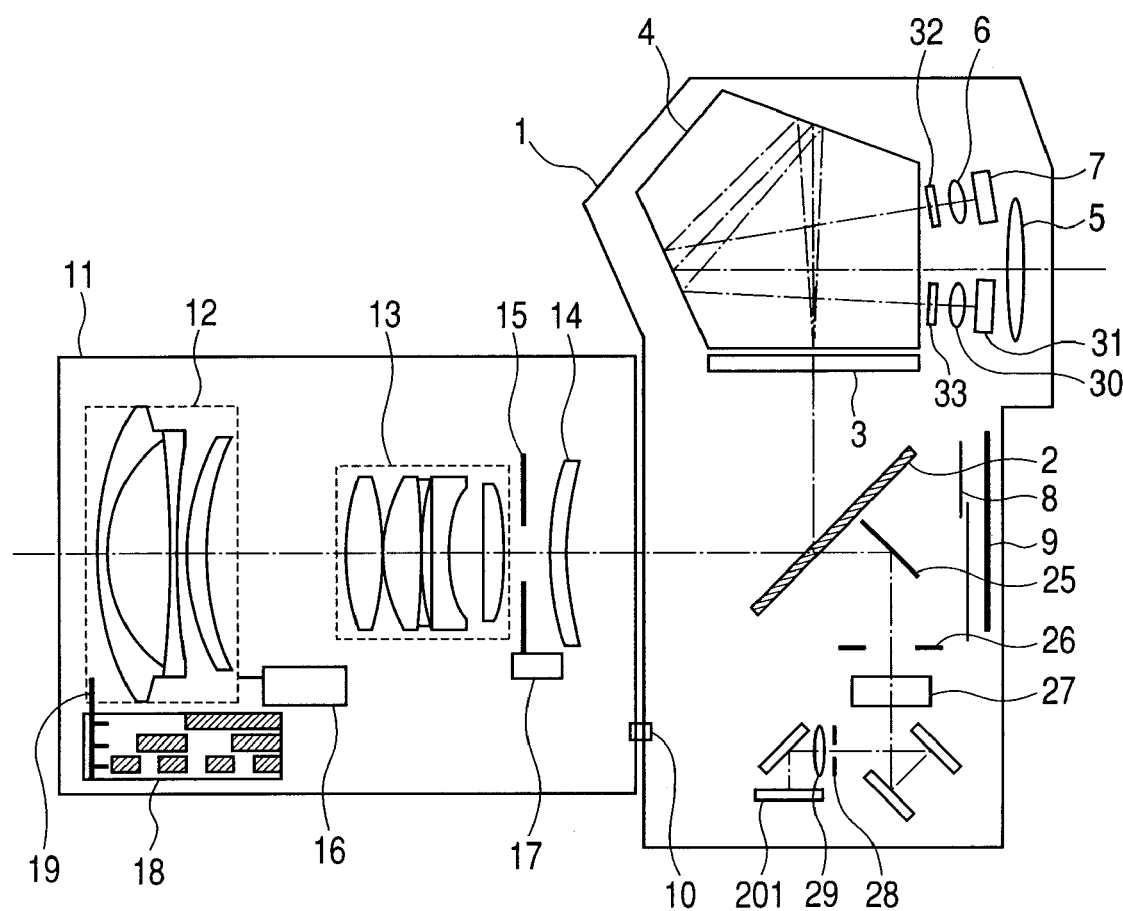
FIG. 1 is a configuration diagram illustrating an auto-focus camera system according to an exemplary embodiment of the present invention.

FIG. 1 is a configuration diagram illustrating an auto-focus camera system according to an exemplary embodiment of the present invention and which includes a single lens reflex camera and an interchangeable lens to be mounted on the camera. The diagram primarily illustrates an optical positional relationship of the system.

Figure 17:
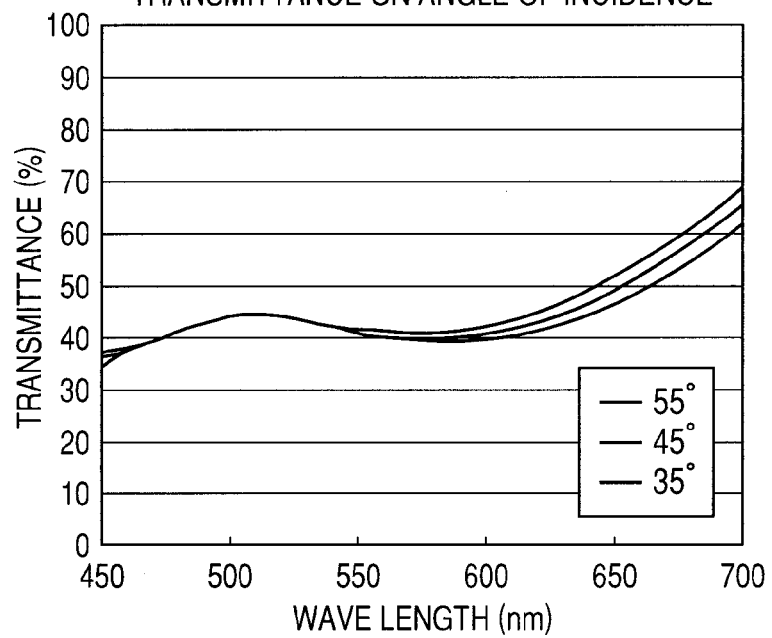
FIG. 17 is a diagram illustrating a dependency on angle of incidence of a spectrum transmittance of a main mirror.

In the diagram, a photographing lens 11 is mounted on a front face of a camera main body 1. Optical parts, mechanical parts, an electric circuit, and a film or an imaging element such as a CCD are housed in the camera main body 1 so as to enable photography of a picture or an image. An optical member 2 that is a main mirror (hereinafter referred to as an optical member) is obliquely provided in a photographing optical path in a finder observation state and is withdrawn from the photographing optical path in a photographing state. In addition, the optical member 2 is arranged as a semi-transparent mirror that partially transmits or reflects an incident light and has the spectrum transmittance characteristics illustrated in FIG. 17 when obliquely positioned in the photographing optical path.

A focus plate 3 is disposed on a predicted imaging plane of lenses 12 to 14, to be described later, and makes up a finder optical system. A penta prism 4 is provided for changing finder optical paths. A photographer can observe a photographing screen by observing the focus plate 3 via an eyepiece 5. A first imaging lens 6 and a first photometry sensor 7, as well as a second imaging lens and a second photometry sensor 31, are provided for measuring an object brightness in the finder observation screen. An optical filter 32 shields long wavelength light and an optical filter 33 shields visible light.

Also provided are a focal plane shutter 8 and an imaging element 9. A sub mirror 25 is obliquely provided in the photographing optical path in a finder observation state and is withdrawn from the photographing optical path in a photographing state together with the optical member 2. The sub mirror 25 bends downward a light beam transmitted through the obliquely-placed optical member 2, and forms an image on a focus detection sensor 201 via a field mask 26, a field lens 27, an iris 28, and a secondary imaging lens 29. An in-focus state can be detected by processing an image signal obtained by photoelectrically converting the image.

A mount contact group 10 becomes a communication interface between the camera main body 1 and the photographing lens 11. Among lenses 12 to 14, a first group lens (hereinafter referred to as focusing lens) 12 adjusts an in-focus position of a photographing screen by moving back and forth on an optical axis, a second group lens 13 varies a focal length of the photographing lens 11 and magnifies the photographing screen by moving back and forth on an optical axis, and a third group lens 14 is fixed. Also provided is an iris 15. A focus drive motor moves the focusing lens 12 back and forth in the direction of the optical axis during automatic focal adjustment operations. An iris drive motor 17 varies an aperture diameter of the iris 15. A sliding movement of a brush 19 fixed to the focusing lens 12 causes a distance encoder 18 to read a position of the focusing lens 12 and generate a signal corresponding to an object distance.

Next, a circuit configuration of the aforementioned camera system will be described with reference to FIG. 2. Components shared by FIG. 1 are denoted using the same reference characters. First, a circuit configuration inside the camera main body 1 will be described.

Connected to the camera microcomputer 100 are the focus detection sensor 201, the first photometry sensor 7, the second photometry sensor 31, a shutter control circuit 107, a motor control circuit 108, and a liquid crystal display circuit 111. In addition, the camera microcomputer 100 performs signal transmission to/from a lens microcomputer 50 disposed in the photographing lens 11 via the mount contact 10. Furthermore, the camera microcomputer 100 incorporates a shading compensation operation circuit 113 that performs compensation operations on shading of pixel signals obtained by the focus detection sensor 201, and a memory 112 for storing shading coefficients.

The focus detection sensor 201 performs accumulation control of photoelectrically converted signals according to a signal from the camera microcomputer 100 and outputs a pixel signal to the camera microcomputer 100. The camera microcomputer 100 performs an A/D conversion on the pixel signal to obtain an image signal. Shading compensation is performed on the image signal (before compensation) by the shading compensation operation circuit 113 based on a shading coefficient stored in advance in the memory 112 and on light source information, to be described later, so as to eliminate a difference in light amount distribution between pixels of the focus detection sensor 201. A focal adjustment state is detected from the compensated image signal by a phase difference detection method. Focal adjustment control of the photographing lens is performed by exchanging signals with the lens microcomputer 50.

The shutter control circuit 107 performs conduction control on a shutter front blade drive magnet MG-1 and a shutter rear blade drive magnet MG-2 which make up the focal plane shutter 8 according to a signal from the camera microcomputer 100 to drive the shutter front blade and the shutter rear blade and perform an exposure operation. The motor control circuit 108 moves the optical member 2 up and down and performs shutter charging by controlling a motor M according to a signal from the camera microcomputer 100.

A switch SW1 is switched on by a first stroke (half depression) of a release button, not shown, to initiate photometry and AF (automatic focal adjustment). A switch SW2 is switched on by a second stroke (full depression) of the release button to initiate shutter driving or, in other words, an exposure operation. The camera microcomputer 100 reads state signals of the respective switches including the switches SW1 and SW2, as well as an ISO sensitivity setting switch, an iris setting switch, and a shutter speed setting switch, which are operating members not shown. The liquid crystal display circuit 111 controls a display unit of finder 24 and an external display unit 42 according to a signal from the camera microcomputer 100.

Next, an internal electric circuit configuration of the photographing lens 11 will be described. The camera main body 1 and the photographing lens 11 are mutually electrically connected via the lens mount contact 10. The lens mount contact 10 is made up of: a contact L0 that is a power supply contact of the focus drive motor 16 and the iris drive motor 17 in the photographing lens 11; a power supply contact L1 of the lens microcomputer 50; a clock contact L2 for performing serial data communication; a contact L3 for data transmission from the camera main body to the photographing lens 11; a contact L4 for data transmission from the photographing lens 11 to the camera main body 1; a motor ground contact L5 for a motor power supply; and a ground contact L6 for a power supply of the lens microcomputer 50.

The lens microcomputer 50 is connected to the camera microcomputer 100 via the lens mount contact 10 and operates the focus drive motor 16 that drives the focusing lens 12 and the iris drive motor 17 that drives the iris 15 according to a signal from the camera microcomputer 100 to control focal adjustment and the aperture of the photographing lens 11. A pulse board 51 and a light detector 52 enable the lens microcomputer 50 to count the number of pulses so as to obtain positional information of the focusing lens 12 during focal adjustment (focusing operation). Accordingly, focal adjustment of the photographing lens 11 can be performed. Positional information of the focusing lens 12 read from the aforementioned distance encoder 18 is input to the lens microcomputer 50 to be converted to object distance information and transmitted to the camera microcomputer 100.

Figure 2:
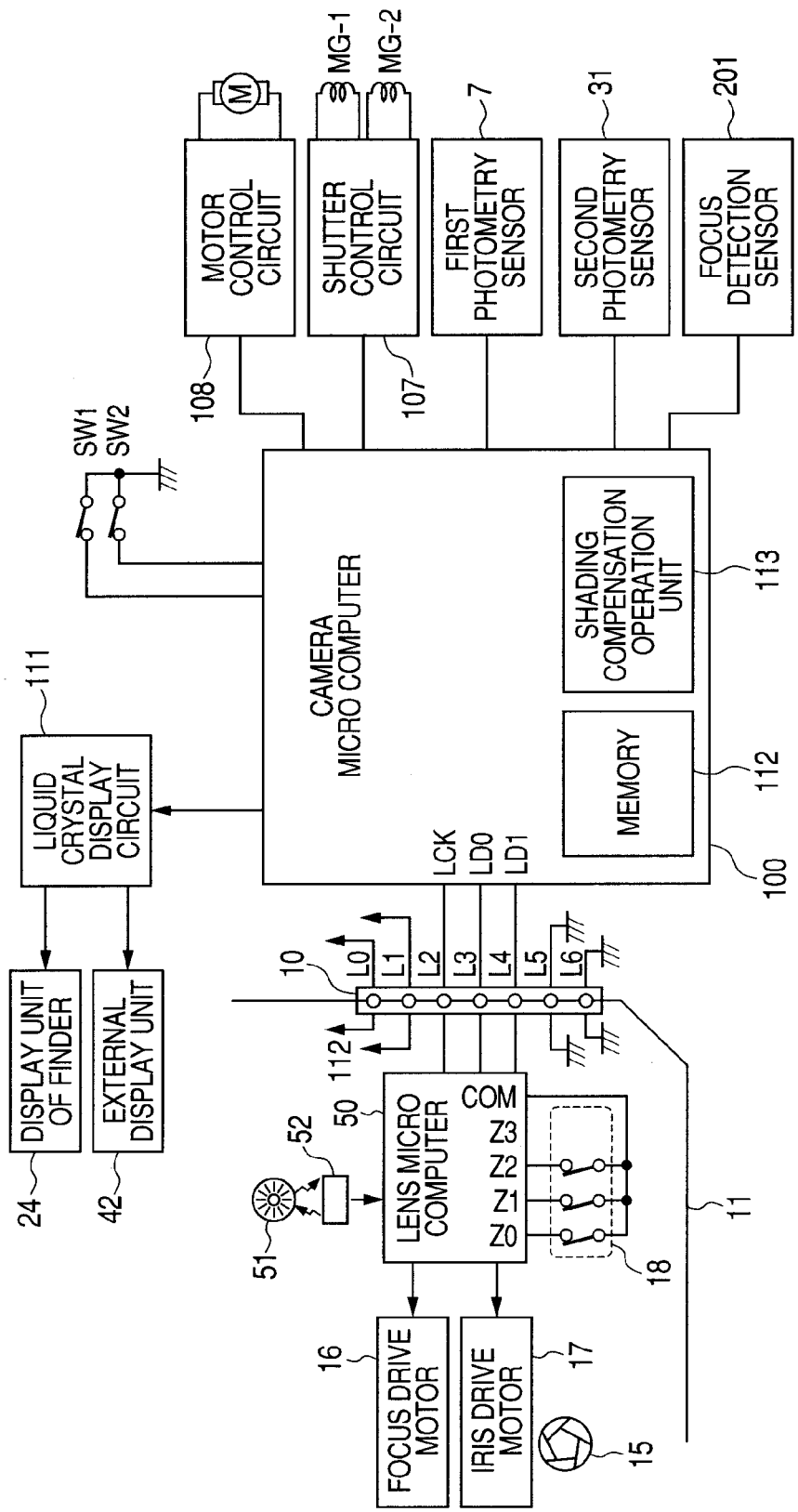
FIG. 2 is a circuit configuration diagram illustrating an auto-focus camera system according to an exemplary embodiment of the present invention.

As described above, operations of the camera system according to the present invention and illustrated in FIG. 2 is controlled by the camera microcomputer 100. As will be described later, the control is executed according to flow charts illustrated in any of FIGS. 7, 9, 10, and 11, and is realized by executing a program read from the memory as will be understood by those skilled in the art.

Figure 3:
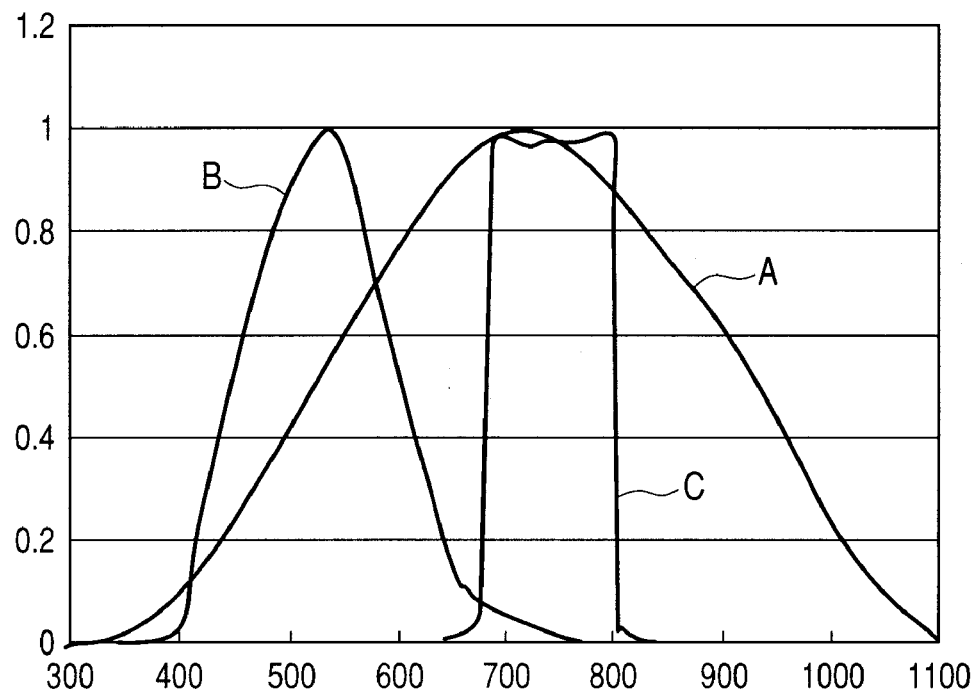
FIG. 3 is a diagram illustrating spectral characteristics of first and second photometry sensors.

Next, spectral characteristics of the first and second photometry sensors will be described with reference to FIG. 3.

In the diagram, spectral sensitivity characteristics of the first and second photometry sensors and 31 are denoted by A, spectral sensitivity characteristics of an optical filter 32 disposed in front of the first photometry sensor 7 are denoted by B, and spectral sensitivity characteristics of an optical filter 33 disposed in front of the second photometry sensor 31 are denoted by C. Therefore, the first photometry sensor detects light in the visible light region whose dependency on angle of incidence of spectrum transmittance at the main mirror is relatively low. On the other hand, the second photometry sensor can detect light in a long-wavelength region (near infrared and larger) whose dependency on angle of incidence of spectrum transmittance at the optical member 2 is relatively high. A ratio between the visible light region and the long-wavelength region becomes light source information.

Figure 4:
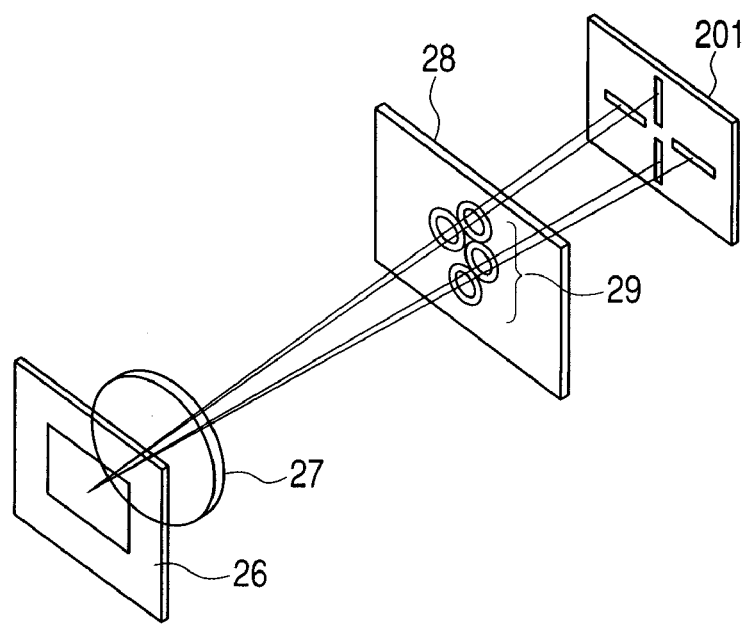
FIG. 4 is a diagram illustrating a detailed configuration of an optical system related to focus detection.

Next, the focus detection sensor 201 will be described in detail using FIGS. 4 to 6. FIG. 4 is a diagram illustrating a detailed configuration of an optical system related to focus detection. A light flux obtained from an object light from an object irradiated by a light source is transmitted through the photographing lens 11 and reflected by the sub mirror 25, and forms an image in the vicinity of the field mask 26 that exists on a plane conjugated to the imaging plane. FIG. 4 illustrates, in a developed format, an optical path folded by a plurality of mirrors after being reflected by the sub mirror 25. The field mask 26 is a member for shielding excess light in regions of the screen other than the focus detection region.

The field lens 27 functions to form images of the respective openings of the iris 28 in the vicinity of the exit pupil of the photographing lens 11. The secondary imaging lens 29 is disposed behind the iris 28 and is made up of two lenses forming a pair. The lenses respectively correspond to openings of the iris 28. Light fluxes having passed through the field mask 26, the field lens 27, the iris 28, and the secondary imaging lens 29 form images on a line sensor on the focus detection sensor 201.

Figure 5:
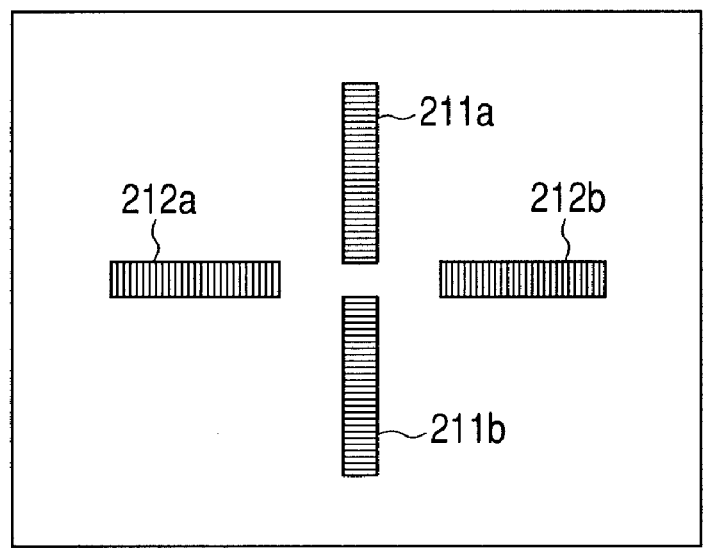
FIG. 5 is a diagram illustrating a line arrangement of a focus detection sensor.

FIG. 5 is a diagram illustrating line sensor locations in the focus detection sensor 201. Line sensors 211*a*, 211*b*, 212*a*, and 212*b* are arranged in the focus detection sensor 201 in pairs of two so as to form a plurality of line sensor pairs.

Figure 6:
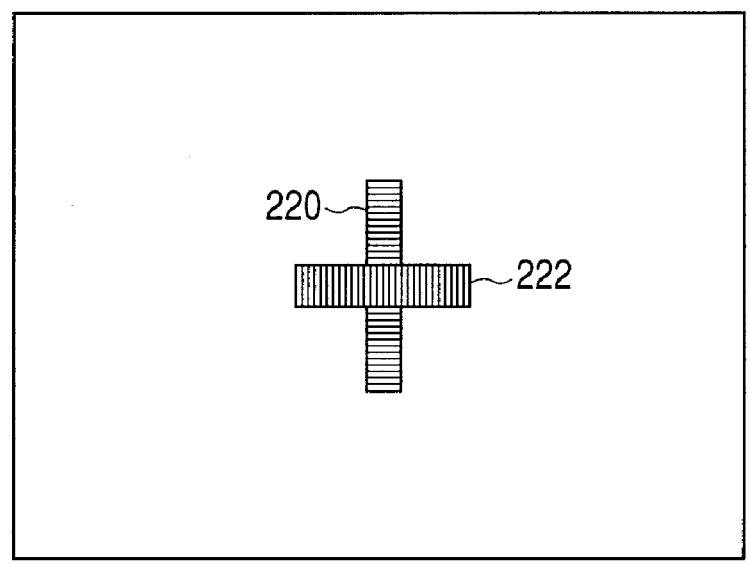
FIG. 6 is a diagram illustrating an AF field arrangement of a focus detection sensor.

FIG. 6 is a diagram illustrating a positional relationship of focus detection regions on an object in a photographing screen. A vertical field 220 that is a focus detection region performs focus detection according to a phase difference of image signals from the line sensor pair 211*a* and 211*b*. A horizontal field 222 that is a focus detection region performs focus detection according to a phase difference of image signals from the line sensor pair 212*a* and 212*b*.

Next, a shading coefficient measurement operation of the focus detection sensor 201 in the camera system configured as described above will be described with reference to the flow chart illustrated in FIG. 7.

Before initiating a shading coefficient measurement operation, an object surface of the camera main body 1 is set under a light having a fluorescent light wavelength in a state of uniform brightness.

The operation starts at step S101 upon receiving a shading coefficient measurement request from a communication tool, not shown, connected to the camera microcomputer. In this case, the camera microcomputer 100 performs an accumulation operation of the line sensors 211*a*, 211*b*, 212*a*, and 212*b* in the focus detection sensor 201. After accumulation is started, an accumulation status is monitored according to a signal from the focus detection sensor 201. Accumulation is suspended once accumulated signals reach a predetermined amount.

In following step S102, a read operation of accumulated image signals is performed by requesting the focus detection sensor 201 to output an image signal. According to a predetermined drive pulse transmitted from the camera microcomputer 100, the focus detection sensor 201 outputs respective image signals in a sequence of line sensors 211*a*→211*b*→212*a*→212*b* as pixel signals. The camera microcomputer 100 reads an image signal by sequentially subjecting the pixel signals to A/D conversion. In step S103, a shading coefficient is computed from the image signal obtained in step S102 and is stored in the memory 112. The shading coefficient measurement operation under a fluorescent light is hereby concluded.

Figure 8:
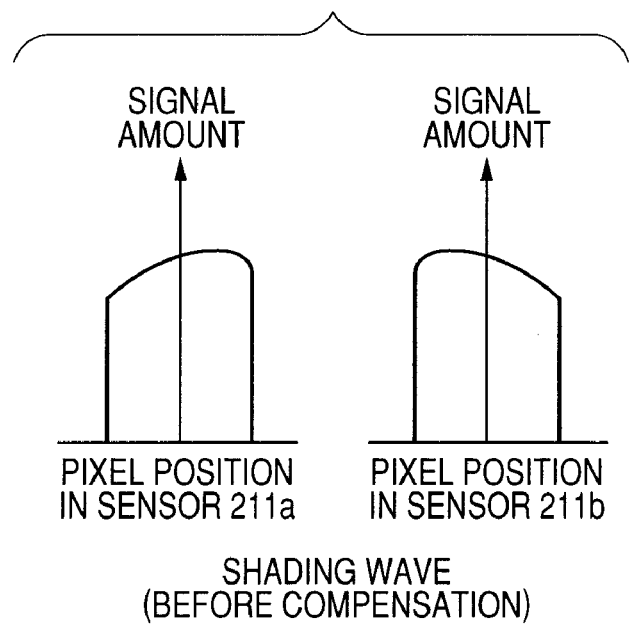
FIG. 8 is a diagram illustrating a shading waveform obtained by a line sensor 211.

A shading coefficient operation method will now be described with reference to FIG. 8. FIG. 8 illustrates image signals accumulated at the line sensors 211*a* and 211*b*. Let $Vs(n)$ denote an nth pixel signal and $Wc(n)$ denote an nth shading coefficient. In addition, if a maximum pixel signal searched from the image signals is denoted by $Vp$, then a shading coefficient can be determined from the following equation.

$$Wc(n)=Vp/Vs(n)$$

Assuming that an nth compensated signal is denoted by $Vo(n)$, then $Vo(n)$ can be determined from the following equation.

$$Vo(n)=Vs(n) \times Wc(n)$$

Consequently, a nonuniform image signal such as shown in FIG. 8 can be compensated to a uniform signal based on $Vp$.

Figure 7:
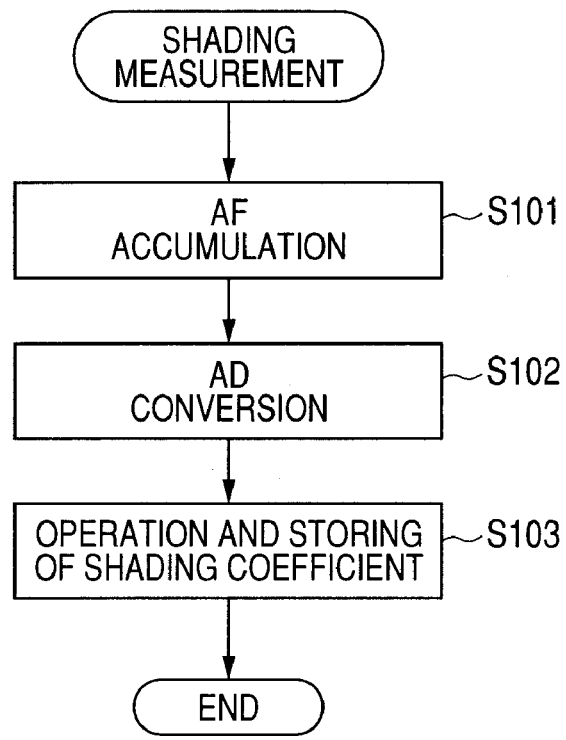
FIG. 7 is a diagram illustrating a flow chart of a shading coefficient measurement and a storing operation according to an exemplary embodiment of the present invention.
Figure 18:
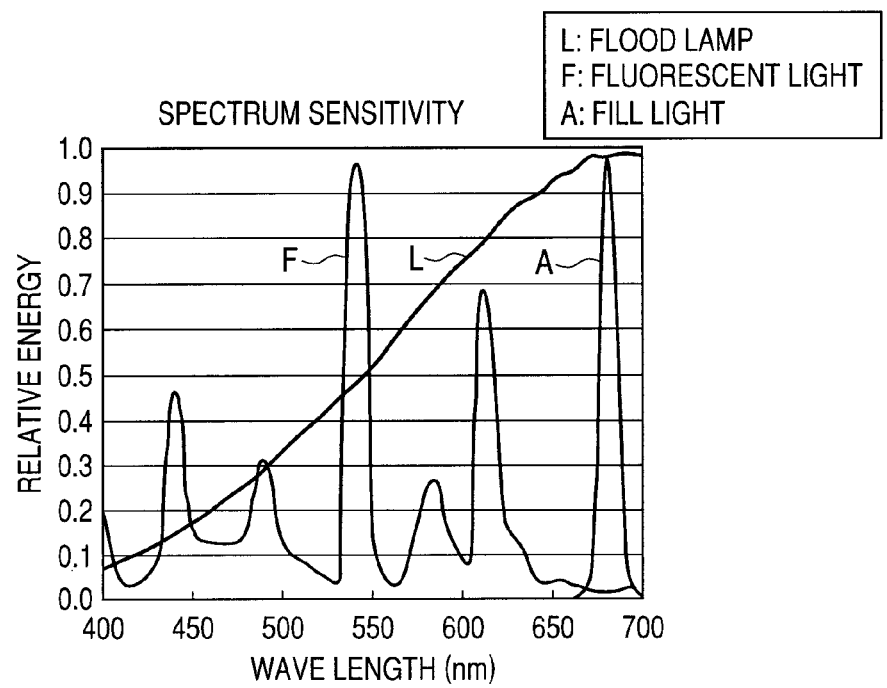
FIG. 18 is a diagram illustrating spectral sensitivities of various light source types.
Figure 19A:
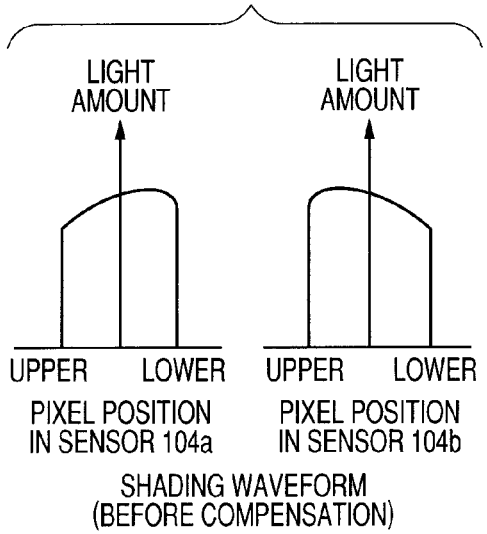
FIGS. 19A and 19B are diagrams respectively illustrating shading waveforms under fluorescent light.
Figure 19B:
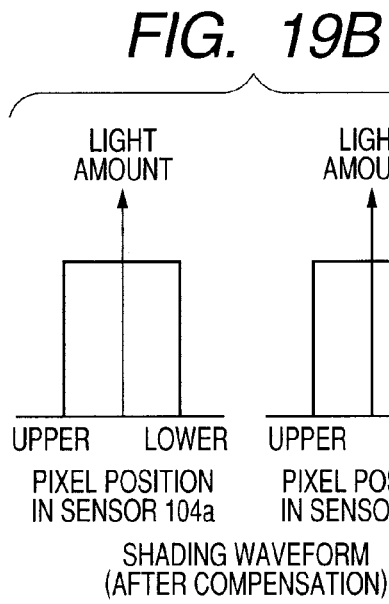
Figure 20A:
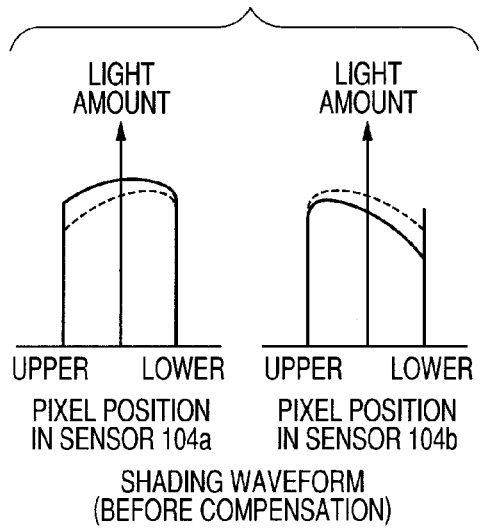
FIGS. 20A and 20B are diagrams respectively illustrating shading waveforms under a flood lamp.
Figure 20B:
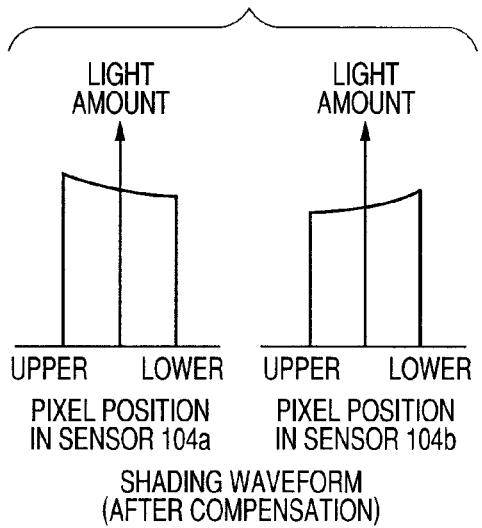
Figure 21A:
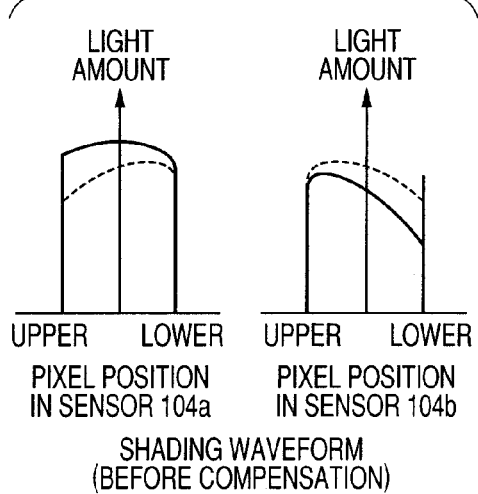
FIGS. 21A and 21B are diagrams respectively illustrating shading waveforms under fill light.
Figure 21B:
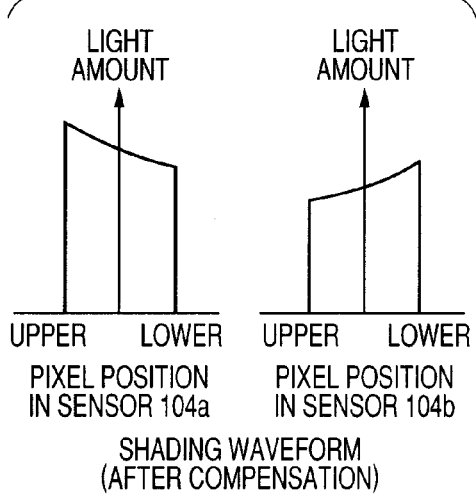

In addition, while the operation represented by the flow chart illustrated in FIG. 7 is a measurement operation under a fluorescent light, by switching light sources, shading coefficients with respect to a flood lamp and a fill light illustrated in FIG. 18 can be measured and stored in the same manner as the operation illustrated in FIG. 7. In this case, a shading coefficient according to a flood lamp light is to be denoted by $Wf$ and a shading coefficient according to a fill light is to be denoted by $Wir(n)$.

Figure 9:
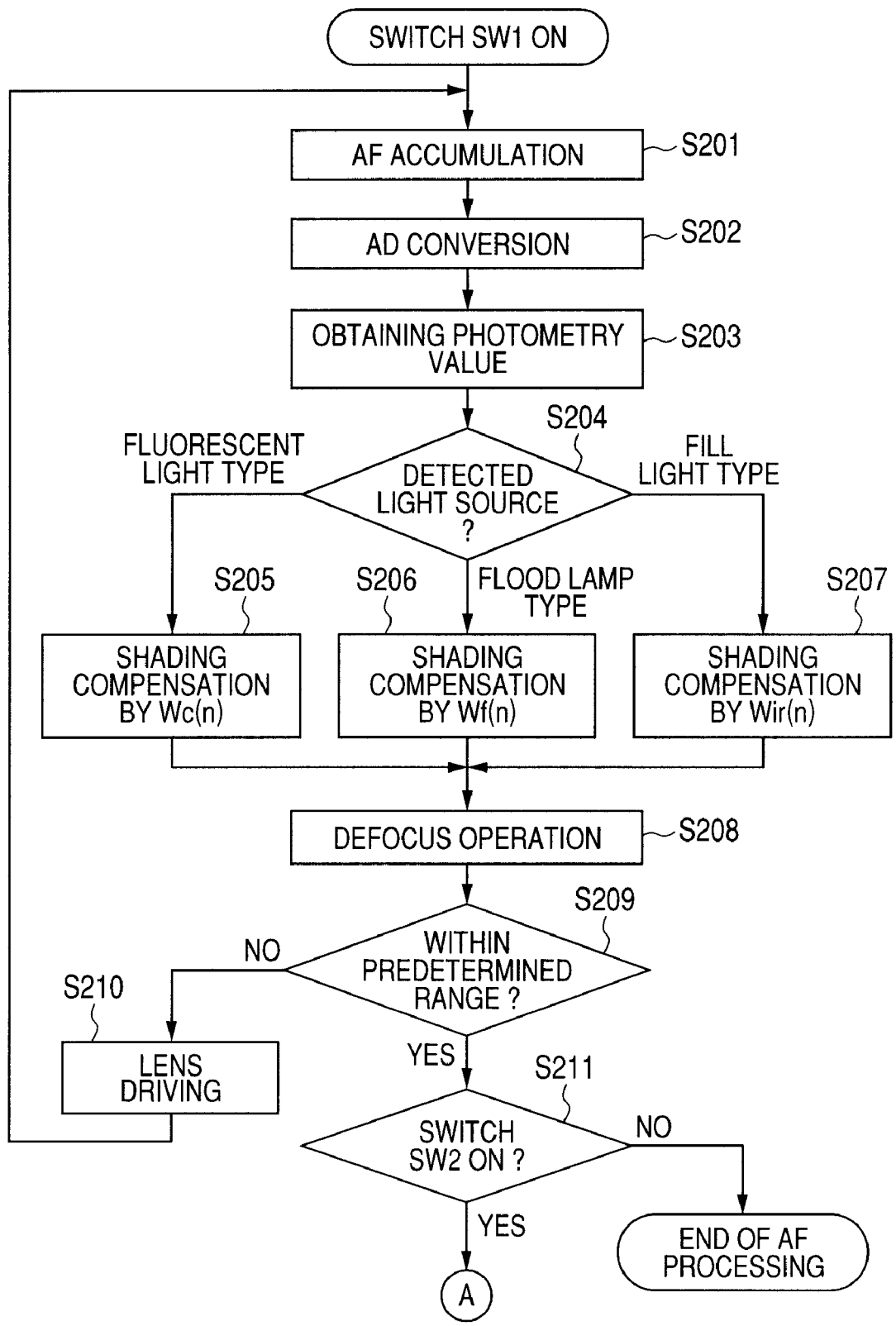
FIG. 9 is a diagram illustrating a flow chart of an AF operation performed by a camera mounted with a focus detection apparatus according to a first exemplary embodiment of the present invention.

Next, an auto-focusing operation of the camera according to the first embodiment will be described with reference to the flow chart illustrated in FIG. 9. Operation starts at step S201 when the switch SW1 on the camera main body 1 illustrated in FIG. 2 is pressed. In this case, the camera microcomputer 100 performs an accumulation operation of the line sensors 211*a*, 211*b*, 212*a*, and 212*b* in the focus detection sensor 201. After accumulation is started, an accumulation status is monitored according to a signal from the focus detection sensor 201. Accumulation is suspended once accumulated signals reach a predetermined amount.

In following step S202, a read operation of accumulated image signals is performed by requesting the focus detection sensor 201 to output an image signal. According to a predetermined drive pulse transmitted from the camera microcomputer 100, the focus detection sensor 201 outputs respective image signals in a sequence of line sensors 211a→211b→212a→212b as pixel signals. The camera microcomputer 100 reads an image signal by sequentially subjecting the pixel signals to A/D conversion.

In next step S203, photometric values of the first photometry sensor 7 and the second photometry sensor 31 are read (photometry step).

In following step S204, a light source is determined from a ratio between photometric values of the first photometry sensor 7 and the second photometry sensor 31 read in step S203, and light source information representing the determination result is generated (light source information generation unit). In this case, the light source determination result is classified into three types. Assuming that the photometric value obtained by the first photometry sensor 7 is denoted by Bc and the photometric value obtained by the second photometry sensor 31 is denoted by Bir, if $$0.7 < Bc/(Bc+Bir) \leq 1.0,$$

then the light source illuminating the object is determined to be a fluorescent light-type light source and the flow proceeds to step S205. In addition, if $$0.4 < Bc/(Bc+Bir) \leq 0.7,$$

then the light source illuminating the object is determined to be a flood lamp-type light source and the flow proceeds to step S206. Furthermore, if $$0 \leq Bc/(Bc+Bir) \leq 0.4,$$

then the light source illuminating the object is determined to be an AF fill light-type light source and the flow proceeds to step S207.

In step S205, a compensated pixel signal Vo(n) is computed using a shading coefficient Wc(n) under fluorescent light stored in advance in the memory 112 on the pixel signal Vs(n) obtained in step S202 by the shading compensation operation circuit 113. Assuming that an nth compensated signal is denoted by Vo(n), then Vo(n) can be determined from the following equation.

$$Vo(n) = Vs(n) \times Wc(n)$$

In step S206, a compensated pixel signal Vo(n) is computed using a shading coefficient Wf(n) under a flood lamp stored in advance in the memory 112 on the pixel signal Vs(n) obtained in step S202 by the shading compensation operation circuit 113. Assuming that an nth compensated signal is denoted by Vo(n), then Vo(n) can be determined from the following equation.

$$Vo(n) = Vs(n) \times Wf(n)$$

In step S207, a compensated pixel signal Vo(n) is computed using a shading coefficient Wir(n) under an AF fill light stored in advance in the memory 112 on the pixel signal Vs(n) obtained in step S202 by the shading compensation operation circuit 113. Assuming that an nth compensated signal is denoted by Vo(n), then Vo(n) can be determined from the following equation.

$$Vo(n) = Vs(n) \times Wir(n)$$

In step S208, a defocus amount is computed by a known method from a displacement between two images of image signals subjected to shading compensation in step S205, step S206, or step S207.

In following step S209, a determination of in-focus is made if the defocus amount is within a desired range such as (1/4)Fδ (where F denotes a lens aperture value, δ denotes a constant of 20 μm and, as such, a leased iris of an F2.0 lens takes a value of 10 μm) and the auto-focusing operation is concluded. If the defocus amount is greater than (1/4)Fδ, in step S210, the defocus amount is transmitted to the lens microcomputer 50 via serial communication lines LCK, LDO, and LDI to instruct lens driving. Upon receiving the instruction, the lens microcomputer 50 determines a drive direction of the focus drive motor 16 according to the received defocus amount and drives the focus drive motor according to the instructed defocus amount. The flow returns to step S201 to repeat the operations described above until an in-focus state is achieved.

In next step S211, a determination is made on a release start switch SW2. If the release start switch SW2 is turned on, the flow proceeds to step S301 that is continued in FIG. 10, and if turned off, the AF process is concluded.

Figure 10:
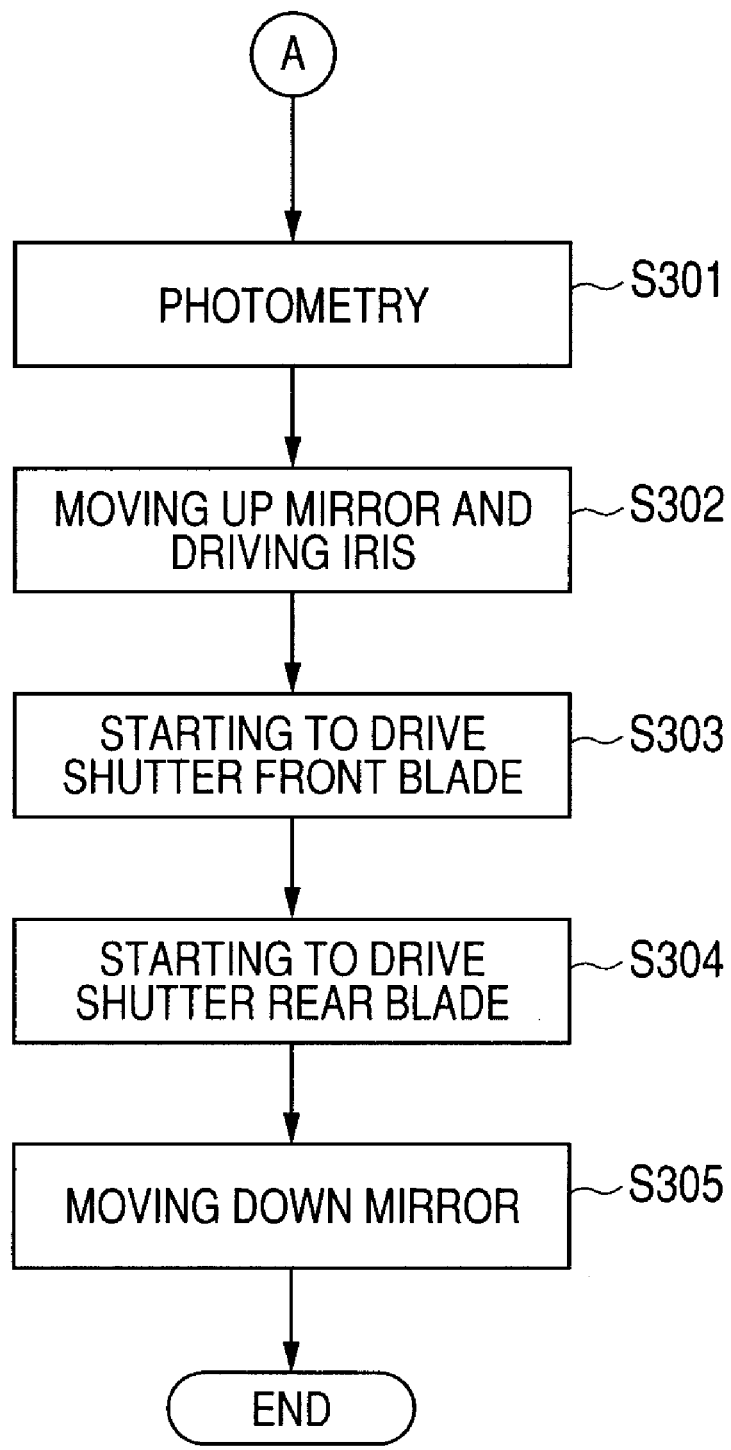
FIG. 10 is a diagram illustrating a flow chart of a photographing operation by a camera mounted with a focus detection apparatus according to a first embodiment of the present invention.

Next, an operation during release will be described with reference to FIG. 10. When the auto-focusing operation described above is concluded and the release start switch SW2 illustrated in FIG. 2 is turned on, in step S301, the camera microcomputer 100 obtains an object brightness BV from a photometric value of the first photometry sensor 7 that measures visible light, obtains an exposure value EV by adding the object brightness BV to a set ISO sensitivity SV, and calculates an aperture value AV and a shutter speed TV using a known method.

In next step S302, the optical member 2 is flipped up and withdrawn from the photographing optical path. At the same time, the camera microcomputer 100 instructs the lens microcomputer 50 to stop down the iris to the aperture value AV determined in step S202, and the lens microcomputer 50 receives the instruction. Subsequently, once the optical member 2 is completely withdrawn from the photographing optical path, in step s303, the camera microcomputer 100 energizes the shutter front blade drive magnet MG-1 and starts an opening operation of the focal plane shutter 8.

After the lapse of a predetermined shutter opening period, the flow proceeds to S304 where the camera microcomputer 100 energizes the shutter rear blade drive magnet MG-2, closes the rear blade of the focal plane shutter 8 to end exposure and to move the optical member 2 down in step S305, and concludes photography.

As described above, a camera according to the first exemplary embodiment of the present invention is arranged such that when performing shading compensation on a pixel signal obtained by a focus detection sensor, a light source illuminating an object is determined by a light source detection sensor and compensation is carried out using the optimum shading coefficient among shading coefficients under a plurality of light sources which have been measured and stored in advance (operations of step S204 to step S207). Consequently, the accuracy of focus detection can be improved.

Operational expressions and compensation formulas of shading coefficients are not limited to those described above and other operational expressions may be used instead.

Similarly, thresholds for light source determination are not limited to those described above and other thresholds may be used instead.

Furthermore, according to the description heretofore provided, shading coefficients are respectively measured and stored under various light source types for the line sensors 211a, 211b, 212a, and 212b. However, since light fluxes with respect to the horizontal lines 212a and 212b have very similar angles of incidence to the optical member (for example, the difference between angles of incidence is equal to or less than a predetermined amount) and light source dependence of shading is minimal, measurement and storage operations can be performed under a single light source. In this case, compensation may be performed using a shading coefficient under a single light source regardless of the light source determination result.

<Second Embodiment>

In the first embodiment, compensation is performed by selecting, according to a light source determination result, any one of a plurality of shading coefficients stored in advance.

The second embodiment described below is an exemplary embodiment that performs a compensation operation that differs from the first embodiment.

Figure 11:
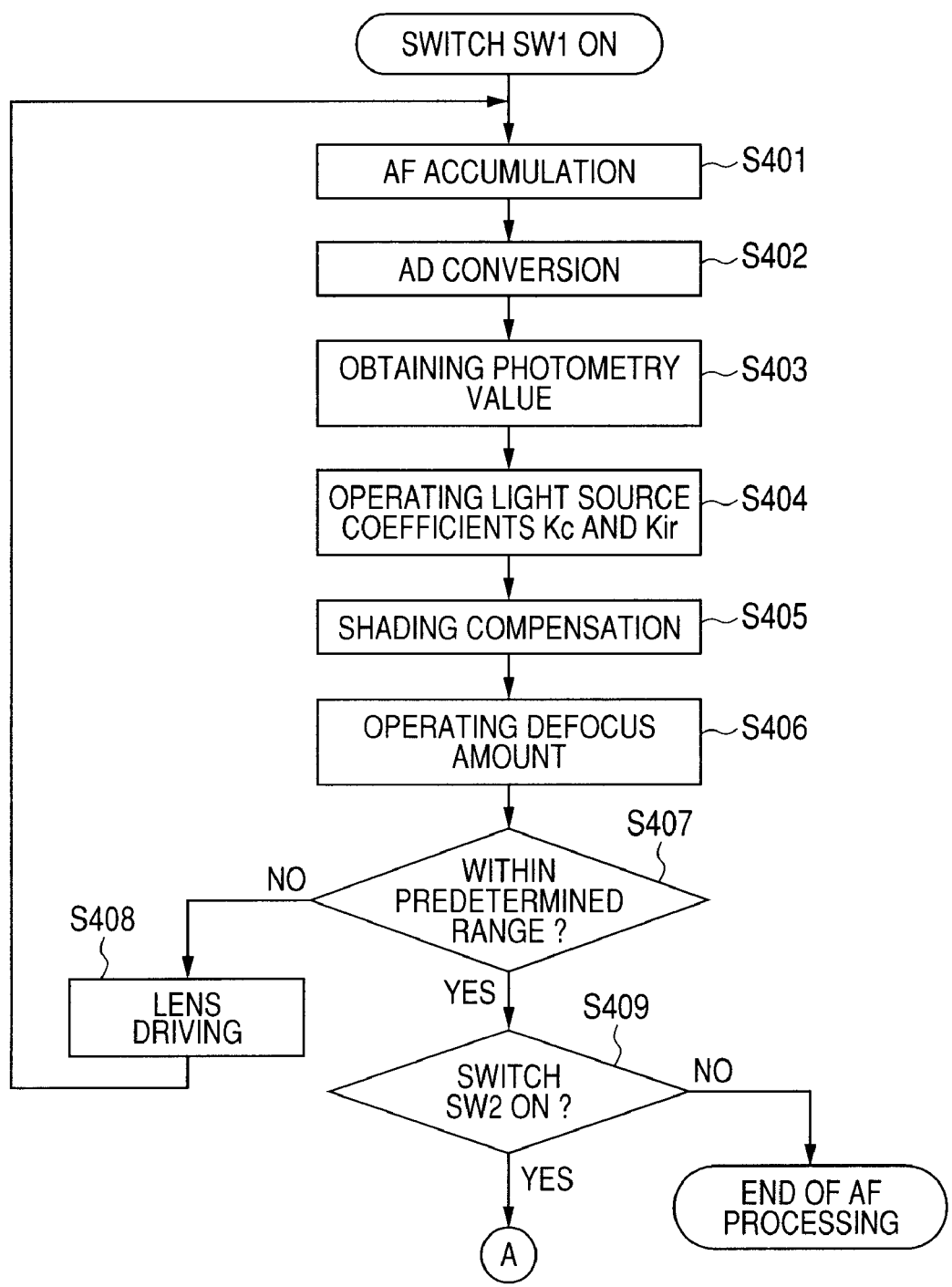
FIG. 11 is a diagram illustrating a flow chart of an AF operation using a camera mounted with a focus detection apparatus according to a second embodiment of the present invention.
Figure 14:
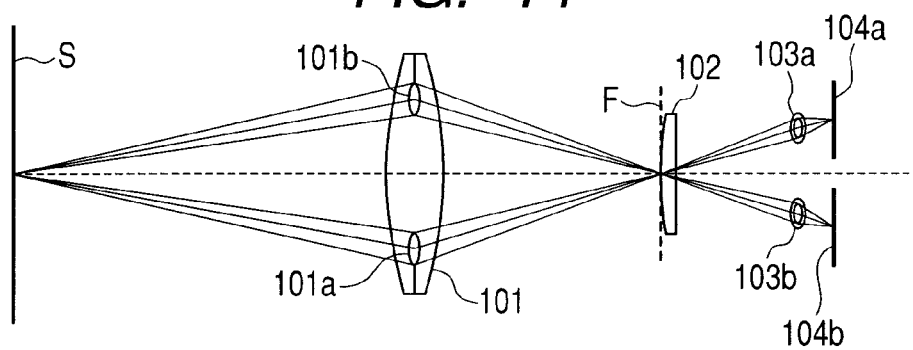
FIG. 14 is a diagram illustrating an optical system of a phase difference detection-type focus detection apparatus using a secondary imaging system.
Figure 15:
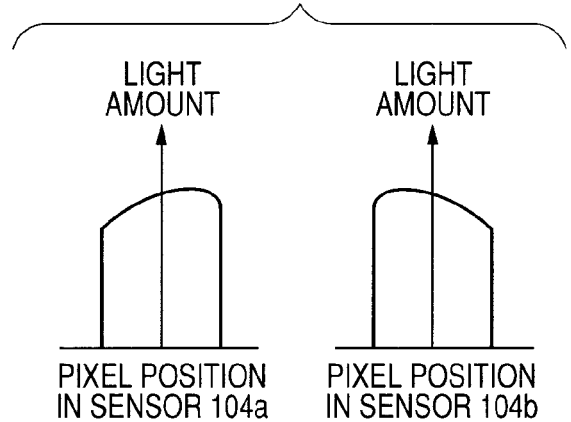
FIG. 15 is a diagram illustrating shading of sensors 104a and 104b.
Figure 16:
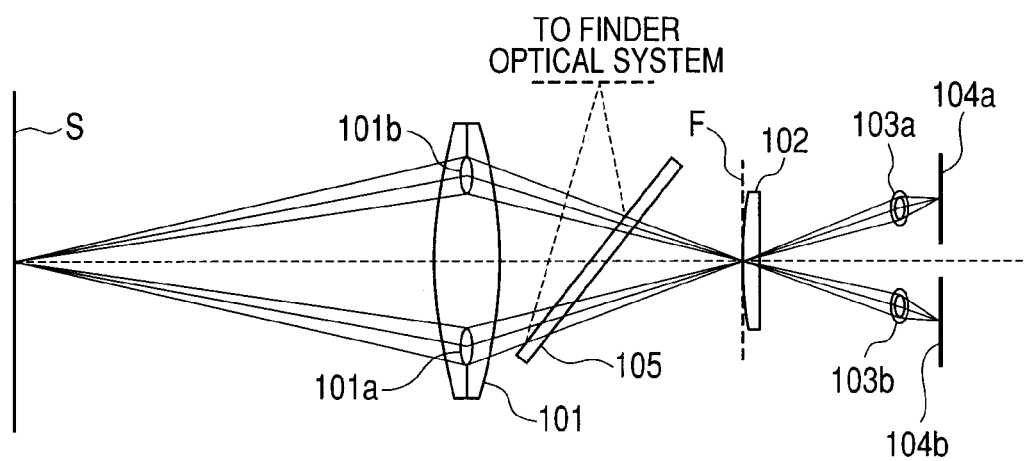
FIG. 16 is a diagram illustrating an optical system of a focus detection apparatus of a single lens reflex camera.

FIG. 11 is a flow chart for describing an auto-focusing operation of a camera related to the second embodiment of the present invention. A control flow illustrated in FIG. 11 will be described with reference to FIG. 14 described earlier.

Operation starts at step S401 when the switch SW1 on the camera main body 1 illustrated in FIG. 2 is pressed. In this case, the camera microcomputer 100 performs an accumulation operation of the line sensors 211a, 211b, 212a, and 212b in the focus detection sensor 201. After accumulation is started, an accumulation status is monitored according to a signal from the focus detection sensor 201. Accumulation is suspended once accumulated signals reach a predetermined amount.

In following step S402, a read operation of accumulated image signals is performed by requesting the focus detection sensor 201 to output an image signal. According to a predetermined drive pulse transmitted from the camera microcomputer 100, the focus detection sensor 201 outputs respective image signals in a sequence of line sensors 211a→211b→212a→212b as pixel signals. The camera microcomputer 100 reads an image signal by sequentially subjecting the pixel signals to A/D conversion.

In next step S403, photometric values of the first photometry sensor 7 and the second photometry sensor 31 are read.

In following step S404, light source coefficients are computed from a ratio between photometric values of the first photometry sensor 7 and the second photometry sensor read in step S403. In this case, a coefficient Kc (first coefficient) representing the proportion of visible light and a coefficient Kir (second coefficient) representing the proportion of near infrared light among spectral components of the light source are computed according to the following equations. In the following equation, a photometric value obtained by the first photometry sensor 7 is denoted by Bc and the photometric value obtained by the second photometry sensor 31 is denoted by Bir.

$$Kc = Bc/(Bc+Bir)$$

$$Kir = Bir/(Bc+Bir)$$

In next step S405, a compensated pixel signal Vo(n) is computed with respect to the pixel signal Vs(n), obtained in step S402 by the shading compensation operation circuit 113, according to the following equation using a shading coefficient Wc(n) under fluorescent light and a shading coefficient Wir under an AF fill light stored in advance and light source coefficients Kc and Kir computed in step S404.

$$Vo(n) = Vs(n) \times \{(Kc \times Wc(n)) + (Kir \times Wir(n))\}.$$

In step S406, a defocus amount is computed by a known method from a displacement between two images of an image signal subjected to shading compensation in step S405.

In following step S407, a determination of in-focus is made if the defocus amount is within a desired range such as (1/4)Fδ (where F denotes a lens aperture value, δ denotes a constant of 20 μm and, as such, a leased iris of an F2.0 lens takes a value of 10 μm) and the auto-focusing operation is concluded. If the defocus amount is greater than (1/4)Fδ, in step S408, the defocus amount is transmitted to the lens microcomputer 50 via serial communication lines LCK, LDO, and LDI to instruct lens driving. Upon receiving the instruction, the lens microcomputer 50 determines a drive direction of the focus drive motor 16 according to the received defocus amount and drives the focus drive motor according to the instructed defocus amount. Subsequently, the flow returns to step S401 to repeat the operations described above until an in-focus state is achieved.

In next step S409, a determination is made on a release start switch SW2. If the release start switch SW2 is turned on, the flow proceeds to step S301 that is continued in FIG. 10, and if turned off, the AF process is concluded. Since FIG. 10 illustrates the same camera operation as the first exemplary embodiment, a description thereof will be omitted.

As described above, a camera according to the second exemplary embodiment of the present invention is arranged such that when performing shading compensation on a pixel signal obtained by a focus detection sensor, a coefficient Kc representing the proportion of visible light and a coefficient Kir representing the proportion of near infrared light of a light source are computed as light source information by a light source detection sensor (operations of step S403 and step S404). In addition, by using light source coefficients Kc and Kir for weighting of a shading coefficient Wc under a fluorescent light (visible light) and a shading coefficient under an AF fill light (near infrared light) stored in advance, appropriate shading coefficients can be computed even under light source of different types (the operation of step S405). In other words, the accuracy of focus detection can be improved according to the use of light sources of different types.

Furthermore, since a shading compensation operation can be performed as long as shading coefficients corresponding to two light source types are available, a memory capacity necessary for storage can be reduced.

Moreover, operational expressions and compensation formulas of shading coefficients are not limited to those described above and other operational expressions may be used instead.

<Third Embodiment>

Cameras according to the first embodiment and the second embodiment perform compensation based on light source detection results and a plurality of shading coefficients stored in advance.

The third embodiment described below is an exemplary embodiment that performs a compensation operation that differs from the first embodiment and the second embodiment.

Figure 12:
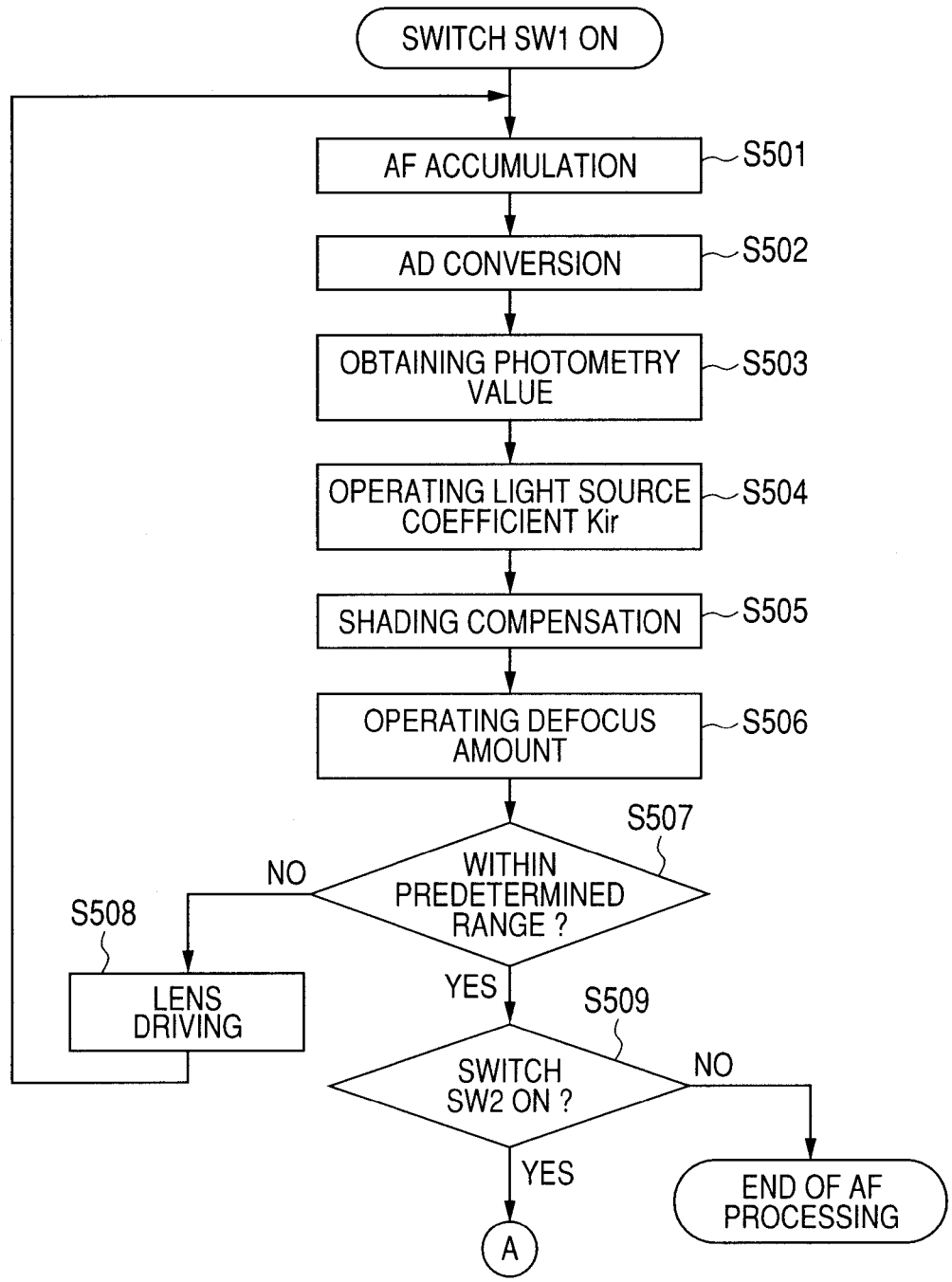
FIG. 12 is a diagram illustrating a flow chart of an AF operation using a camera mounted with a focus detection apparatus according to a third embodiment of the present invention.

FIG. 12 is a flow chart for describing an auto-focusing operation of a camera related to the third embodiment of the present invention. A control flow illustrated in FIG. 12 will be described with reference to FIG. 14 described earlier.

Operation starts at step S501 when the switch SW1 on the camera main body 1 illustrated in FIG. 2 is pressed. In this case, the camera microcomputer 100 performs an accumulation operation of the line sensors 211a, 211b, 212a, and 212b in the focus detection sensor 201. After accumulation is started, an accumulation status is monitored according to a signal from the focus detection sensor 201. Accumulation is suspended once accumulated signals reach a predetermined amount.

In following step S502, a read operation of accumulated image signals is performed by requesting the focus detection sensor 201 to output an image signal. According to a predetermined drive pulse transmitted from the camera microcomputer 100, the focus detection sensor 201 outputs respective image signals in a sequence of line sensors 211a→211b→212a→212b as pixel signals. The camera microcomputer 100 reads an image signal by sequentially subjecting the pixel signals to A/D conversion.

In next step S503, photometric values of the first photometry sensor 7 and the second photometry sensor 31 are read.

In following step S504, light source coefficients are computed from a ratio between photometric values of the first photometry sensor 7 and the second photometry sensor 31 read in step S503. In this case, a proportion of near infrared light denoted by Kir is computed using the following equation. In the equation, a photometric value obtained by the first photometry sensor 7 is denoted by Bc and a photometric value obtained by the second photometry sensor 31 is denoted by Bir.

$$Kir=Bir/(Bc+Bir)$$

In next step S505, a compensated pixel signal Vo(n) is computed with respect to the pixel signal Vs(n), obtained in step S502 by the shading compensation operation circuit 113, according to the following equation using a shading coefficient Wc(n) under fluorescent light stored in advance, a light source coefficient Kir computed in step S504, and an angle of incidence coefficient a(θ) of the optical member.

$$Vo(n)=Vs(n)\times\{Wc(n)+(a(\theta)\times Kir)\}$$

Figure 13:
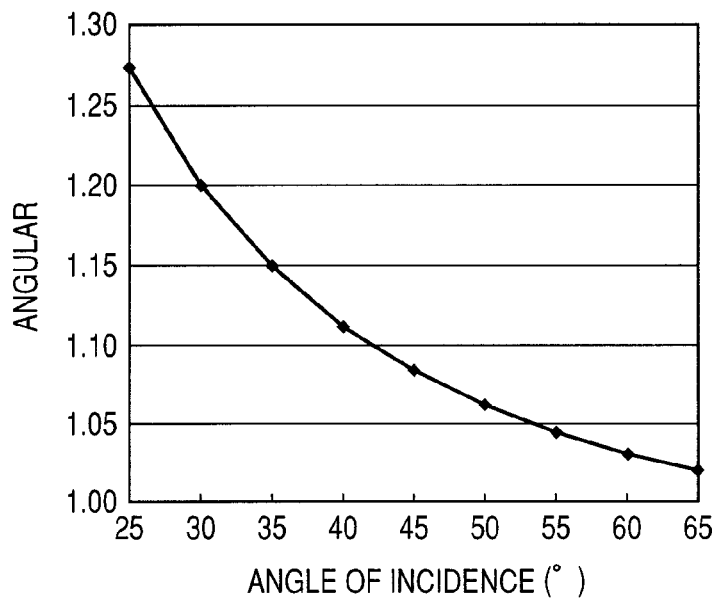
FIG. 13 is a diagram illustrating a relationship between angles of incidence to a main mirror and shading angular coefficients.

In this case, the angle of incidence coefficient a(θ) of the optical member numerically represents a rate of change of the angle of incidence and shading when a light flux (near infrared light) enters an optical member. An example is illustrated in FIG. 13.

Since the angle of incidence differs for each pixel, when performing shading compensation, a compensation operation is performed using a coefficient a(θ) corresponding to the angle of incidence of the compensated pixel.

In step S506, a defocus amount is computed by a known method from a displacement between two images of an image signal subjected to shading compensation in step S505.

In next step S507, a determination of in-focus is made if the defocus amount is within a desired range such as (1/4)Fδ (where F denotes a lens aperture value, δ denotes a constant of 20 μm and, as such, a leased iris of an F2.0 lens takes a value of 10 μm) and the auto-focusing operation is concluded. If the defocus amount is greater than (1/4)Fδ, in step S508, the defocus amount is transmitted to the lens microcomputer 50 via serial communication lines LCK, LDO, and LDI to instruct lens driving. Upon receiving the instruction, the lens microcomputer 50 determines a drive direction of the focus drive motor 16 according to the received defocus amount and drives the focus drive motor according to the instructed defocus amount. Subsequently, the flow returns to step S501 to repeat the operations described above until an in-focus state is achieved.

In next step S509, a determination is made on a release start switch SW2. If the release start switch SW2 is turned on, the flow proceeds to step S301 that is continued in FIG. 10, and if turned off, the AF process is concluded. Since FIG. 10 illustrates the same camera operation as the first exemplary embodiment, a description thereof will be omitted.

As described above, a camera according to the third exemplary embodiment of the present invention is arranged such that when performing shading compensation on a pixel signal obtained by a focus detection sensor, a coefficient Kir representing the proportion of near infrared light is computed by a light source detection sensor (operations of step S503 and step S504). In addition, by using a shading coefficient We under a fluorescent light (visible light) and an angle of incidence coefficient a(θ) of the optical member stored in advance, appropriate shading coefficients can be computed even under light source of different types (the operation of step S505). In other words, the accuracy of focus detection can be improved even when light sources of different types are used.

Furthermore, since a shading compensation operation can be performed as long as a coefficient corresponding to a single light source type is available, a memory capacity necessary for storage can be further reduced. Needless to say, operational expressions and compensation formulas of shading coefficients are not limited to those described above and other operational expressions may be used instead.

It is to be understood that the exemplary embodiments described above are merely specific examples of implementing the present invention and are not intended to limit the technical scope of the present invention in any way. In other words, various changes and modifications may be made without departing from the technical ideas or primary features of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-118592, filed May 15, 2009, which is hereby incorporated by reference herein in its entirety.

What is claimed is:

1. A focus detection apparatus comprising:
    a focus detection sensor that detects an image signal of an object based on a light flux obtained from an object light transmitted through a photographing lens;
    a first photometry sensor that measures a visible light;
    a second photometry sensor that measures a light whose wavelength is longer than the visible light; and
    a compensation unit that compensates the image signal from the focus detection sensor based on outputs from the first and second photometry sensors,
    wherein the compensation unit performs weighting on the image signal from the focus detection sensor according to the position of each pixel so as to eliminate a difference between light amount distributions among respective pixels of the focus detection sensor which is caused by a light flux from a plane with uniform brightness of the object.

2. The focus detection apparatus according to claim 1, further comprising a storage unit that stores a weight coefficient for weighting for each type of light source that illuminates the object, wherein the weight coefficient is generated by measuring, in advance, a difference in light amount distributions that is created between respective pixels of the focus detection sensor by a light flux from a plane with a uniform brightness of the object irradiated by light sources of a plurality of types so as to eliminate the difference, light source information indicating a light source type is generated based on outputs from the first and second photometry sensors, and the compensation unit compensates an image signal from the focus detection sensor based on a weight coefficient corresponding to a light source type determined by the light source information.

3. The focus detection apparatus according to claim 1, further comprising a storage unit that stores a first coefficient corresponding to the visible light and a second coefficient corresponding to the light whose wavelength is longer than the visible light measured in advance, wherein the compensation unit generates a weight coefficient from light source information indicating a light source type generated based on outputs from the first and second photometry sensors and on the first and second coefficients, and compensates an image signal from the focus detection sensor based on the generated weight coefficient.

4. The focus detection apparatus according to claim 1, further comprising an optical member disposed between the photographing lens and the focus detection sensor, wherein the optical member reflects or transmits a part of a light flux obtained from an object light transmitted through the photographing lens, the compensation unit generates a weight coefficient based on light source information indicating a light source type generated based on outputs from the first and second photometry sensors and on an angle of incidence of a light flux corresponding to each pixel when entering the optical member, and compensates an image signal from the focus detection sensor based on the generated weight coefficient.

5. The focus detection apparatus according to claim 1, further comprising an optical member disposed between the photographing lens and the focus detection sensor, wherein the optical member reflects or transmits a part of a light flux obtained from an object light transmitted through the photographing lens, the focus detection sensor includes a plurality of pairs of line sensors arranged in different directions, and when a difference between angles of incidence of light fluxes entering line sensors forming a pair among the plurality of pairs of line sensors when entering the optical member is equal to or smaller than a predetermined amount, the compensation unit does not use outputs from the first and second photometry sensors when compensating an image signal from the line sensors.

6. A control method of a focus detection apparatus comprising:

detecting an image signal of an object based on a light flux obtained from an object light transmitted through a photographing lens using a focus detection sensor;

measuring a visible light using a first photometry sensor;

measuring a light whose wavelength is longer than the visible light using a second photometry sensor; and compensating the image signal from the focus detection sensor based on outputs of measurements respectively performed using the first and second photometry sensors, wherein the compensating the image signal comprises performing weighting on the image signal from the focus detection sensor according to the position of each pixel so as to eliminate a difference between light amount distributions among respective pixels of the focus detection sensor which is caused by a light flux from a plane with uniform brightness of the object.

\* \* \* \* \*